United States Patent
Braverman

(10) Patent No.: US 6,423,359 B1
(45) Date of Patent: Jul. 23, 2002

(54) PROCESS FOR PREPARING MILK-BASED FREEZABLE CONFECTIONS

(76) Inventor: Amiel Braverman, 730 W. Sedgwick St., Philadelphia, PA (US) 19119

( * ) Notice: Subject to any disclaimer, the term of this patent is extended or adjusted under 35 U.S.C. 154(b) by 0 days.

(21) Appl. No.: 09/505,407

(22) Filed: Feb. 16, 2000

Related U.S. Application Data

(63) Continuation-in-part of application No. 09/309,899, filed on May 11, 1999, now abandoned, which is a division of application No. 09/150,524, filed on Sep. 10, 1998, now abandoned, which is a continuation of application No. 08/806,933, filed on Feb. 26, 1997, now abandoned.

(51) Int. Cl.$^7$ .................................................. A23G 9/02
(52) U.S. Cl. ........................ 426/565; 426/573; 426/577; 426/590
(58) Field of Search ............................... 426/565, 100, 426/101, 577, 573, 590

(56) References Cited

U.S. PATENT DOCUMENTS

| | | | |
|---|---|---|---|
| 1,710,505 A | | 4/1929 | North |
| 1,989,758 A | | 2/1935 | Linn |
| 2,168,934 A | | 8/1939 | Haskins et al. |
| 2,854,340 A | | 9/1958 | Kohler et al. |
| 3,174,865 A | | 3/1965 | Johnston et al. |
| 3,619,205 A | | 11/1971 | LeVan |
| 3,784,715 A | * | 1/1974 | Arden |
| 3,914,440 A | | 10/1975 | Witzig |
| 3,914,441 A | * | 10/1975 | Finney et al. |
| 3,922,361 A | | 11/1975 | Vann |
| 4,021,583 A | * | 5/1977 | Arden |
| 4,140,807 A | * | 2/1979 | Braverman |
| 4,216,242 A | * | 8/1980 | Braverman |
| 4,264,637 A | * | 4/1981 | Braverman |
| 4,313,967 A | * | 2/1982 | Kahn et al. |
| 4,430,349 A | * | 2/1984 | Malone et al. |
| 4,532,143 A | * | 7/1985 | Brain et al. |
| 4,808,248 A | | 2/1989 | Forsstrom et al. |
| 4,830,868 A | | 5/1989 | Wade et al. |
| 5,135,768 A | | 8/1992 | Campbell et al. |
| 5,322,702 A | | 6/1994 | Selinger et al. |
| 5,352,474 A | | 10/1994 | Lammers et al. |
| 5,462,761 A | * | 10/1995 | McGinley et al. |
| 6,143,346 A | * | 11/2000 | Glahn |
| 6,221,419 B1 | * | 4/2001 | Gerrish |

FOREIGN PATENT DOCUMENTS

JP    1-317360    * 12/1989

OTHER PUBLICATIONS

Marshall and Arbuckle, "Ice Cream", fifth edition, (1996), pp. 46, 58–62, 72, 82–91, 147, 234–239, 320, 346.*
Arbuckle, "Ice Cream", third edition (1977), pp. 61, 292–300.*

* cited by examiner

*Primary Examiner*—Nina Bhat
(74) *Attorney, Agent, or Firm*—Arnold B. Silverman; Eckert Seamans Cherin & Mellott, LLC

(57) ABSTRACT

Processes for making milk-based freezable confections are disclosed. The confections are liquid at room temperature, and freeze to a sherbet consistency. The present processes use particular gum combinations to attain their unique texture upon freezing and to keep milk proteins and insoluble solids, if used, from settling when the product is liquid.

10 Claims, No Drawings

US 6,423,359 B1

PROCESS FOR PREPARING MILK-BASED FREEZABLE CONFECTIONS

CROSS REFERENCE TO RELATED APPLICATIONS

This application is continuation of Ser. No. 09/309,899 filed on May 11, 1999 abandoned which is a continuation-in-part of U.S. Ser. No. 09/150,524, filed Sep. 10, 1998 now abandoned, which is a continuation of U.S. Ser. No. 08/806,933, filed Feb. 26, 1997 now abandoned.

FIELD OF THE INVENTION

The present invention relates to processes for making freezable confections in the form of "freeze it yourself" pops and cups, and the confections produced thereby. More specifically, the present invention relates to methods for making milk-based freezable confections that are a homogenous liquid at room temperature and a sherbet consistency when frozen; the confections maintain a stable opacity even when subjected to rigorous manufacturing conditions, and can have a high insoluble solids content. Significantly, the present methods produce frozen confections having a sherbet-like texture without the need for air whipping.

BACKGROUND INFORMATION

Liquid confections having different colors and flavors and that are substantially transparent have been sold at room temperature for subsequent freezing to a slushy or icy consistency. These liquid, freezable confections are generally packaged in plastic packs, such as those made of polyethylene, cellophane or other similar films and other resinous plastics. Such confections generally comprise suitable flavoring and coloring agents, sugars or other sweeteners, acids, stabilizers and preservatives. Occasionally, transparent fruit juices, such as apple juice are added as well; opaque juices are generally not suitable for such use as pulpy particles settle or precipitate out of the solution and form a sludge in the bottom of the storage container. The acidity of these confections is usually within a pH range of between about 2.7 and 3.5, which is in line with the characteristic flavor being simulated, namely, that of higher-acid fruits such as lemon, cherry, grape and orange. The confection is conventionally sealed in the plastic film and is ordinarily sold in liquid form at room temperature. The confection can then be frozen by the consumer prior to eating in the form of an ice pop without a stick or in a cup. These "freeze it yourself" pops, however, do not result in a product having a sherbet-like consistency. In addition, because of settling, these products also fail to incorporate nutritionally beneficial components such as milk or fruit particles.

U.S. Pat. Nos. 4,163,807 and 4,264,637 are directed to freeze it yourself pops. These pops are room temperature storable confections having a pudding-like consistency at room temperature that freeze to a chewy consistency. The methods taught in the '807 patent produce inconsistent results and products that have a highly icy texture upon freezing; products made according to the '637 patent are gummy or slimy to the taste and utilize costly microcrystalline cellulose. Thus, neither of these patents teach methods for making freeze it yourself pops having a sherbet consistency when frozen by the consumer.

In addition, numerous frozen confection products are and have been commercially available that are purchased by the consumer in the frozen state. The texture of these products is achieved in part by the introduction of air, also known as "over-run", during production. Thus, air is entrapped in the product. Melting and re-freezing of the product will not result in the same consistency as the originally purchased product.

None of the products sold or reported in the art are milk-based freezable confections having a stable opacity and an acidic pH that can be sold in liquid form and frozen by the consumer to yield a product having a sherbet-like consistency, such as the confection disclosed herein. Many of these products further fail to teach methods for incorporation of particles such as cocoa, pigments and fruit purees and pulp that remain suspended in the room temperature liquid phase. Previous attempts at providing such a product have proven unsuccessful, as settling, creaming or syneresis of the product occurred, or have resulted in products that are "gummy" or pudding-like and not preferred by consumers. Furthermore, previous products lacked freeze-thaw stability and did not have a sherbet-like texture when frozen by the consumer.

Accordingly, there remains a need for processes for making milk-based freezable confections having a stable opacity that can be sold in liquid form and frozen by the consumer without air whipping, that are cost effective, that result in a product have substantive nutritive value, and that result in a product having freeze-thaw stability and a consistent sherbet-like mouth feel.

SUMMARY OF THE INVENTION

The present invention has met the above described need by providing processes for making milk-based freezable confections, or "freeze it yourself" pops and cups, having a homogenous liquid consistency at room temperature (about 20° C.) and a sherbet-like consistency when frozen by the consumer. The terms "freezable confections" and "freeze it yourself" as used herein refer to pops or cups that the consumer purchases at ambient temperatures in a liquid state and freezes, when desired, in a home freezer. The present process is unique in that it results in such freeze it yourself products wherein solids, such as milk solids or fruit particles, remain suspended in the liquid state. Significantly, the frozen product has a mouth feel akin to sherbet or sorbet, which texture is achieved through the use of the novel processes and ingredient combinations recited herein; previous products having such a smooth mouth feel or aerated texture have been achieved only through use of air whipping by the manufacture. Air whipped products are not freeze it yourself, but rather are purchased by the consumer in a frozen state; thawing and refreezing these products does not result in a product having the same consistency as the original frozen product. The present methods result in a product having stable opacity and stable freeze-thaw characteristics, where the same consistency is achieved when frozen regardless of how often the product is thawed and refrozen. In addition, the present processes can be used to make confections having a significant level of milk; these creamy tasting confections do not have the fat of ice cream desserts, however, and can be low or nonfat if skim milk is used.

It is therefore an aspect of the present invention to provide processes for preparing milk-based freezable confections having stable opacity with virtually no creaming or settling of the ingredients.

Another aspect of the present invention is to provide such a process resulting in milk-based freezable confections that are liquid at room temperature, that do not experience any phase separation during storage, and that freeze, without whipping, to a sherbet consistency.

Another aspect of the invention is to provide methods for making freezable confections with enhanced nutritional value through the use of milk, milk products, soy products, fruit juices and fruit purees, which do not undergo settling or creaming during storage in the liquid state.

These and other aspects of the invention will be more fully understood from the following description of the invention.

DESCRIPTION OF THE PREFERRED EMBODIMENT

The present invention is generally directed to processes for making an edible, room-temperature storable, milk-based freezable confection composition. The confection is characterized as being liquid at room temperature and having a sherbet consistency when frozen; it maintains a stable opacity through manufacturing and storage. In addition, the processes provide for incorporation of various insoluble or nonsoluble solids in the confections; insoluble or nonsoluble solids or particles, as used herein, include but are not limited to cocoa, pigments and fruit purees, pieces and pulps. These solids remain in suspension throughout storage even in the liquid phase.

The present processes generally start with mixing water, milk and a stabilizing gum in a mixing vessel; the stabilizer is added in an effective amount, with stirring for a time and strength sufficient to achieve dissolution of the stabilizer. One or more flavorings, sweeteners, colorings or fruit products as desired are then added. Specific embodiments of this process are described below with reference to particular combinations of ingredients depending on the desired product.

The present processes result in freezable confection compositions, which in non-frozen or liquid form, are made homogenous and sufficiently viscous by combining milk with a solution containing a stabilizer; the gum reacts with the milk protein to keep the protein in suspension. In addition, the viscosity which results upon the combination of milk and stabilizer solution prevents or impedes any other particles, such as those of fruit pulp, water dispersible artificial color, or cocoa, from separating or settling out. The present processes further help keep milk protein particles below about 0.5 micron in size, small enough to keep the particles in suspension.

Any type of milk can be used in the present methods including skim, 1%, 2%, whole milk or combinations thereof. Milk products include, but are not limited to, on-fat milk solids (NFMS), dried whole milk, evaporated milk, cream, casein and derivatives, condensed sweetened milk, whey, whey protein and whey protein concentrate. The amount of milk used in the present methods can vary depending on the needs and desires of the user, and can be added in a weight % of the total composition up to 50%. It will be appreciated that the use of milk as well as some additional components listed below will impart nutritive value to the frozen confections prepared by the present methods.

Any suitable nutritive food component can also be added according to the present methods in addition to milk, including but not limited to non-dairy creamers, soy derivatives, such as soy flour, soy milk, soy protein concentrate, soy isolates and the like, cereal grain flour and starch such as wheat flour and corn starch, and maltodextrin; combinations of these ingredients can also be used in the present methods. Cocoa and/or chocolate liquor, which flavor the confections, will normally also give opaqueness to chocolate confections. When using a protein-containing components, such as milk or milk proteins or soy derivatives, the protein portion of this component will combine with the stabilizer, thereby preventing the protein from precipitating out of solution or denaturing the emulsified fat portion of the agent; this imparts permanent opacity to the product.

According to the present methods, the stabilizer or gum should be added in an effective amount. The term "effective amount" when used in reference to the stabilizer means the amount of stabilizer necessary for the confection to maintain protein and insoluble solids in solution, and typically ranges between about 0.1 and 1.0 weight % of the final product. As will be appreciated by one skilled in the art, more than 1.0 weight % of stabilizer can be used but typically will not be necessary to achieve the desired results. Suitable stabilizers for use in the present method include xanthan gum, propylene glycol alginates, and pectins. The stabilizer used must be capable of interacting with the milk proteins and any other proteins that may be added; the stabilizer must therefore be present in an amount sufficient to react with all of the protein present. The stabilizer must also be used in an amount sufficient to enable any insoluble particles such as cocoa, fruit pulp, fruit puree, titanium dioxide or emulsified fat from the milk or creamer to be suspended throughout the confection. Thus, a frozen confection with suspended insoluble solids that is liquid at room temperature is produced. Table 1 illustrates the appropriate stabilizer to use in the present methods depends on various factors, such as the amount and type of milk used, the presence of other proteins, the presence of other insoluble solids, and the final pH.

TABLE 1

| Type and Wt. % Milk | low skim 1–10% | low skim 1–10% | high skim 10–50% | high skim 10–50% | low whole 1–10% | low whole 1–10% | high whole 10–50% | high whole 10–50% |
| --- | --- | --- | --- | --- | --- | --- | --- | --- |
| No/Low Insoluble Solids | YES | NO | YES | NO | YES | NO | YES | NO |
| High Insoluble Solids | NO | YES | NO | YES | NO | YES | NO | YES |
| Gum @ pH | xanthan 2.9–6.5 | pectin 3.8–4.5 | propylene glycol | pectin 3.8–4.5 | xanthan 2.9–6.5 | pectin 3.8–4.5 | propylene glycol | pectin 3.8–4.5 |

TABLE 1-continued

| Type and Wt. % Milk | low skim 1–10% | low skim 1–10% | high skim 10–50% | high skim 10–50% | low whole 1–10% | low whole 1–10% | high whole 10–50% | high whole 10–50% |
|---|---|---|---|---|---|---|---|---|
| | propylene glycol alginate 2.9–6.5 | alginate 2.9–6.5 | | | propylene glycol alginate 2.9–6.5 | | alginate 2.9–6.5 pectin 3.8–4.5 | |

Table 1, therefore, provides the appropriate stabilizer (or "gum") to use when using low amounts (from about 1 up to about 10 wt. %) or high amounts (above about 10 to 50 wt. %) of either skim or whole milk and the presence or absence of either low or high insoluble solids. As used herein, the terms low insoluble solids and high insoluble solids refer to the amount of insoluble solids in a particular formulation and will vary depending on the type of additives desired by the user. It is within the skill of one practicing in the art to determine whether conditions of "high", "low" or "no" insoluble solids exist. The following examples of insoluble solids are also provided:

TABLE 2

| Foodstuffs, considered in wt. %: | 'Low' | 'High' |
|---|---|---|
| Orange juice, high pulp | about 1.0 | over 1.0 |
| Orange juice concentrate, 58° Brix, "Futures" grade | about 1.0 | over 1.0 |
| Strawberry puree | about 2.0 | over 2.0 |
| Apple sauce | about 5.0 | over 5.0 |
| Cocoa | virtually none | any amount |
| Titanium dioxide | about 0.03 | over 0.03 |

Where the level of both milk and insoluble solids is low, xanthan gum is the preferred stabilizer. Xanthan gum is produced by pure-culture fermentation of the microorganism *Xanthomonas campestis* which yields a high molecular weight polysaccharide from glucose. Xanthan gum is a mixed potassium, sodium and calcium salt of the polysaccharide, which contains mannose, glucose and glucuronic acid. Xanthan gum is commercially available as a powder from the Kelco Company as Keltrol® Because there is a gustatory limit to the use of xanthan gum (usually above 0.3 wt. %) xantham gum is not suitable in all of the present processes. Xantham gum can be used, for example, when using milk in a concentration of between about 1 up to about 10 wt. % of the total composition. Milk at such concentrations will not have appreciable levels of protein, so the amount of xanthan gum needed to coat the protein and prevent its agglomeration does not generally need to exceed about 0.30 wt. %. Xanthan gum can also be used when using milk or milk products at less than 10 wt. % and when also using other non-soluble solids, such as fruit pulps, so long as the nonsoluble solids are present in relatively low levels. "Low levels", when used in this context refers to levels of nonsoluble solids which can be maintained in solution when using about 0.30 wt. % or less of xanthan gum. Examples of "low" amounts of insoluble solids are given above in Table 2.

Propylene glycol alginate is a derivative of alginic acid, which is an insoluble colloidal acid that is a constituent of the cell walls of brown algae. Alginic acid is a polymer of mannuronic acid and guluronic acid; the proportion between the two acids depends on the type of seaweed. Propylene glycol alginates are available from Kelco Company. Kelcoloid® S is particularly suitable, and a combination of Kelcoloid S and Kelcoloid® HV in a 75:25 wt. % ratio is the most preferred for the present processes. Propylene glycol alginates are effective in a pH range of between about 2.9 and about 6.5, and are preferred in methods where any amount of milk is used, but where there are low or no insoluble solids. For example, in products wherein milk is used in a concentration of between 1 and 50 wt. %, and no additional amounts of insoluble solids are present, propylene glycol alginate is an appropriate stabilizer. Propylene glycol alginates are preferably used in a total concentration of between about 0.50 and 1.25 wt. % of the final product. This gum stabilizes milk proteins, that is, prevents their agglomeration, but does not create a psuedopiastic condition that would prevent insoluble solids from settling. Therefore, high levels of suspended insoluble particles should not be present when using propylene glycol alginates.

When high levels of insoluble solids, as that term is defined above, and high levels of milk (above about 10 to 50 wt. %) are present, pectin is the preferred stabilizer. Pectin is a purified carbohydrate product obtained by aqueous extraction of appropriate edible plant material. Pectin consists mainly of galacturonic acid and galacturonic acid methyl ester units. High methyl ester (HM) pectin, and low methyl ester (LM) pectin are suitable for use in the present methods, as discussed below, and according to the present methods are used together.

HM-pectin and LM-pectin are available from Hercules Co. A preferred HM pectin is YM-100H. LM pectins vary with their degree of milk reactivity which usually range from "high to low". The former tend to thicken or gel at higher temperature and their use requires keeping the batch at higher temperature (i.e. greater than about 80° C.) throughout the process to avoid "pre-set" or pre-mature gel; their advantage is that their use requires less rapid cooling. LM pectin, 101AS least reactive; LM 20 AS, medium reactive; and LM 104 AS-most reactive, will all work well. The preferred LM pectin is 20 AS.

Combining both HM and LM pectins allows the use of maximum effective pectin to react with all the available milk, while at the same time achieving the proper consistency and suspension of the insoluble solids. A combination of HM and LM pectins should be used in a total concentration of between about 0.2 and 1.0 wt. % of the final formulation; this sufficiently thickens the product and controls settling or creaming of insoluble solids. The proportion of HM and LM pectins should be about 50:50, although some adjustment could be made to increase the LM portion to 60 wt. % when a higher degree of gelation is preferred.

Sodium citrate can be used when the stabilizer is either propylene glycol alginate or HM/LM pectin. If used, the sodium citrate should be present in a concentration of between about 0.1 to 0.4 wt. % of the total composition; this helps keep the milk protein from agglomerating. When chocolate flavor is used, use of sodium citrate is not recommended.

Several sweetener combinations can be used in the present methods, selected from the following categories:

a) natural sweeteners of "high sweetness" such as cane or beet sugar, fructose, corn sugar (dextrose), High Fructose Corn Syrups (all grades), and corn syrup of 60 or higher D.E.;

b) natural sweeteners of "low sweetness" such as corn syrup of lower than 60 D.E., corn syrup solids, and maltodextrins (approx. 25 D.E.); and c) artificial sweeteners such as saccharain, Aspartame, sucralose (McNeil Specialty Prods.), Acesulfame K (American Hoechst Corp.).

As is understood by one skilled in the art, "Degree of Sweetness" is commonly rated on a scale based on sucrose=100. "High sweetness", as will be appreciated, refers to sweetener sources which have a sweetness of higher than about 50 when compared with sucrose, which has a sweetness of 100; "low sweetness" refers to sweetness values of 50 or less on the same scale.

To obtain the desired degree of sweetness and sherbet-like ice crystal formation when the product is frozen, the preferred sweetener is a combination comprising ⅓ "high sweetness" sugars and ⅔ "low sweetness" sugars by weight. The most preferred combination is maltodextrin 25 D.E.-70 wt. % and High Fructose Corn Syrup 42 at 30 wt. %. This particular combination helps in achieving a good freeze/thaw stability which enables the consumer to thaw and then refreeze the confection if desired. The amount of sweetener can be varied depending on the particular formulation used. For example, if a fruit juice concentrate is used, less of a traditional sweetener will be added. Typically, sweetener will comprise about ⅓ of the soluble solids level of the confection.

Any suitable food preservative can be used, if desired, including but not limited to sodium benzoate, potassium sorbate and sodium sorbate. An approximately equal ratio of sodium benzoate to potassium sorbate is preferred in an amount of about 0.04 weight % of the total product.

The acid used to achieve the desired pH can be any edible acid approved for use in food. Suitable acids for use in the present invention include citric acid, malic acid, phosphoric acid, glucono delta lactone, hydrochloric acid, phosphoric acid, lactic acid, tartaric acid, adipic acid and fumaric acid. Generally, citric acid is preferred for fruity flavors; hydrochloric acid, phosphoric acid and glucono delta lactone are preferred for the non-fruity flavors. Use of hydrochloric acid in the present processes is believed to be novel, not previously reported in the preparation of freezable confections. The actual amount of acid used is that which is sufficient to obtain the desired taste and to comply with federal regulations. Typically, up to about 0.6 weight %, more typically about 0.5 weight % of acid, is used to adjust pH to between about 2.9 and 6.5; a pH of between about 3.0 and 4.5 is preferred. A maximum pH of about 4.2 is most preferred for a non-acid type confection, and a pH of 3.0 to 4.0 is most preferred for low and high acid type confections. Acidity of 4.6 and below also restricts the growth of pathogenic microorganisms and is required by the FDA if the product is not aseptically processed. Government regulations mandate a pH of below about 4.6 for food products; these regulations require special processing for low-acid foods having a pH of above about 4.6. A maximum pH of 4.2 is most preferred, to avoid spoilage in the products produced by the present methods. Thus, the present methods provide another advantage, in that they can be used to produce a food product that does not have to be aseptically processed.

In a preferred method, the acid is dissolved in a suitable amount of water to result in a solution having an acid strength of about 10 wt. %, unless hydrochloric or phosphoric acid is used in which case an acid strength of about 5% is preferred; this solution should then be added to the confection mixture with strong agitation. As used herein, "non-acid" flavored confections refer to such things as vanilla, chocolate, butterscotch and caramel flavor, "low-acid" refers to fruit flavors such as mango, guava, banana or coconut, and "high acid" refers to fruit flavors such as lemon, cherry or orange; these terms are well known to one skilled in the art. Low-acid and high-acid ingredients are referred to herein as "acid ingredients" and include fruit pulps, purees and concentrates. Non-acid flavors must not have a noticeable tart taste, but have to be acidified in order to qualify as "acidified foods" to be processed simply by hot filling. Mineral acids suitable for use with food products were found to best fit the above needs. Phosphoric is the preferred acid for vanilla, butterscotch and caramel flavors; hydrochloric acid is the most preferred for chocolate. The present methods produce "non acid" flavored confections that do not have a tart flavor despite being in the acidic pH range. The present methods also allow for milk and acid to be used together without curdling of the milk.

The amount of water present in the aqueous confection compositions is dependent upon the type and concentration of sweetener and the soluble solids present, such as milk and fruit juices, and must result in an aqueous composition having a density of between about 30° to 50° Brix; a confection composition of about 35° and 45° Brix is preferred, and 40° is most preferred.

Any of various flavorings can be used to impart the desired flavor to the confection. For example, the confection can be flavored like a "high acid" fruit, a "low acid" fruit, or have the flavor of a non-fruity, "non-acid" confection.

Chocolate-flavored confections optionally containing non-fat milk solids can be made by using, for example, chocolate liquor and/or cocoa. The cocoa is preferably natural-process and can be used either alone or in combination with chocolate liquor; natural cocoa is preferred. When used, between about 1.5 and 3% by weight of natural low-fat cocoa (10–12 wt. % fat) is preferred.

The addition of vanillin and/or related substances further enhances the unique, sweet, dairy-like taste of the confections. Vanillin-related materials include, but are not limited to, vanilla flavor and vanilla extract, both of which are made from the vanilla bean, ethyl vanillin, natural vanillin, vanillin ex clove and vanillin ex tumeric.

Fruit pulp in the form of, for example, banana, mango or coconut puree or fruit concentrate, such as apple, citrus or pineapple juice concentrate, is optionally added in the present methods. The use of these optional ingredients depends primarily on particular flavor requirements and consumer demands. Any fruit particles present in the fruit pulp or fruit concentrate will be suspended within the body of the confection, both in the liquid state and when frozen.

The present process for preparing milk-based freezable confections, when xanthan or propylene glycol alginate is used, comprises: placing water and milk in a vessel at room temperature; mixing an effective amount of stabilizer with strong agitation to the water/milk mixture; continuing the stirring for at least 10 minutes to complete stabilizer solution and reaction time; adding the sweeteners, and other soluble non-acid ingredients such as color solution and flavors; and adjusting the pH of the mixture with the selected acid to between 2.9 and 6.5. After acidification, acid ingredients such as juices or fruit concentrates can be added. A preservative, if used, can also be added to the mixture at any time and should be dissolved prior to addition.

The volume of the mixture can be adjusted to 100 wt. % as necessary with additional water. The mixture is then heated up to a temperature of between about 79 and 83° C.; containers are then filled with the heated mixture according to conventional procedures.

When using the pectin combination, an alternative procedure should be followed. The methods is as follows:

Place milk and water in a vessel at room temperature and add sodium citrate at about 0.10–0.30 wt. %. When whole milk is used, it should be homogenized at 2100 psi. Add the sweeteners and stir to dissolve; add all other nonacid ingredients, (such as flavorings). Stir and heat to a minimum of between about 75° and 82° C. Keep temperature steady while adding the stabilizer solution, of 5 wt. %, (previously made using 75° C. water). The temperature should be maintained at a min. of 80° C. to prevent "pre-set", premature activation of the pectins, before acidification.

The pH of the mixture is then adjusted with the selected acid, which should be added in a 5–10 wt. % solution. Acidification must be accomplished as rapidly as possible, by adding the acid solution under strong agitation. The temperature should be maintained at least 80° C. until acidification is completed. After the acidification, any "acid" ingredients such as juices or fruit concentrates can be added. Lastly, the volume can be adjusted with water.

The containers or packages should be suitable for filling and sealing at elevated temperatures. Packages made from any suitable material, such as plastic, resinous plastic, and the like are filled and then sealed.

Cooling the filed packages is essential for maintaining the nutritional value of the confection and prolonging its shelf life. Cooling is also important to speeding up the thickening of the gum stabilizers; this helps to prevent nonsoluble solids from creaming or settling. When nonsolubles are absent, the speed of cooling could be about 20–25° C. per hour; when nonsolubles which are known to migrate are present, the cooling should be more rapid, about 5° C. per minute. Cooling can be effective by any conventional means, such as air, nitrogen or cold water spray.

The frozen confections created according to the above methods are opaque, the opacity brought about by the opacity-producing agent as described above. The flavor of the confection can be fruity, or non-fruity. The total soluble solids reflected by a range of from between about 30° to 50° Brix, which corresponds to a density of between about 1.1291 and 1.2320.

Exemplary embodiments of the present invention are illustrated in Table 3. These embodiments are presented in the form of ingredients which are combined into compositions according to the above-described procedure and filled and sealed in plastic packages in the manner well-established in the art. The examples are presented solely for the purpose of illustration, and should not be construed as limiting the invention in any way.

TABLE 3

CONFECTION COMPOSITIONS

| Ingredients (% by weight) | Example 1 Chocolate | Example 2 Orange | Example 3 Mango | Example 4 Vanilla |
|---|---|---|---|---|
| Water | 39.78 | 51.35 | 20.50 | 33.18 |
| Potassium Sorbate | — | — | 0.04 | 0.02 |
| Sodium Benzoate | — | — | — | 0.02 |
| Sodium Citrate | — | — | 0.22 | 0.22 |
| NFMS | 1.20 | 0.50 | — | — |
| Coffee Creamer 50% fat | 3.15 | — | — | — |
| Milk (whole) | — | — | 30.00 | — |
| Milk (skim) | — | — | — | 15.00 |
| Xanthan Gum | — | 0.30 | — | — |
| Low methoxyl pectin wt. 5% solution | 5.40 | — | 5.00 | 5.40 |
| High methoxyl pectin wt. 5% solution | 7.20 | — | 8.00 | 8.00 |
| Cocoa (10 to 11% fat) | 2.50 | — | — | — |
| High Fructose Corn Syrup "42" | 15.70 | — | — | — |
| Maltodextrin | 22.00 | — | 22.40 | 27.20 |
| Orange Flavor, natural | — | 0.26 | — | — |
| Mango Flavor, artificial | — | — | 0.20 | — |
| Chocolate Flavor, artificial | 0.02 | — | — | — |
| Vanillin (flavor) | 0.01 | 0.10 | 0.01 | 0.10 |
| Corn Syrup 42 DE | — | 32.60 | — | — |
| Sucrose | — | 12.70 | 13.40 | 9.00 |
| Citric Acid | — | 0.33 | 0.23 | — |
| Hydrochloric Acid (3.65% volume sol.) | 2.70 | — | — | — |
| Phosphoric Acid (5% wt. sol.) | — | — | — | 1.70 |
| Salt | 0.19 | — | — | 0.16 |
| FD & C Yellow #6 | — | .06 | trace | — |
| Orange Concentrate (58° Brix) | — | 1.80 | — | — |
| Caramel Color | trace | — | — | trace |
| Titanium Dioxide | 0.15 | — | — | — |

EXAMPLES

The following examples are intended to illustrate the invention and should not be construed as limiting the invention in any way. For examples, including those in Table 3: Xanthan gum was obtained from Kelco Co. as Keltrol. Propylene glycol alginates were obtained from Kelco Co. as Kelcoloid "S" and "HV". Maltodextrin was obtained from Grain Processing Corp. as Maltrin M250. HM Pectin (YM-100H) and LM Pectin (101AS) from Hercules Co.

Example 1

Orange Juice and Skim Milk Solids (Low Milk and Low Insoluble Solids) Composition:

| | |
|---|---|
| water | 51.41wt.% |
| skim milk solids | 0.50 |
| xanthan gum | 0.30 |
| corn syrup 42 D.E. | 32.60 |
| sugar | 12.70 |
| orange juice concentrate 58 Brix | 0.80 |
| orange flavor, natural | 0.26 |
| vanilla flavor | 0.10 |
| citric acid | 0.33 |

The water and milk solids are placed in a vessel and allowed to dissolve at room temperature; the gum is then added and dispersed with strong agitation, stirring is continued for at least 10 minutes to complete gum solution and reaction time. The sweeteners are added; mixing is continued until dissolved. The pH of the mixture is adjusted with the acid to about 3.0. The acid should be added at 5–10 wt. % dilution. A preservative, if used, can also be added now and should be dissolved prior to addition. The volume of the mixture is adjusted as necessary. The mixture can now be heated to temperature of between about 79 and 83°C. and filled according to conventional procedures.

Example 2
Coffee and Whole Milk (High Milk and No Insoluble Solids) Composition:

| | |
|---|---|
| water | 36.56wt.% |
| sodium citrate | 0.3 |
| whole milk (homogenized) | 20.00 |
| maltrin, M250 | 28.60 |
| Coffee, instant | 0.50 |
| high fructose corn syrup "42" | 10.70 |
| propylene glycol alginate "S" | 0.67 |
| propylene glycol alginate "HV" | 0.27 |
| phosphoric acid, 5% sol. | 1.7 |
| salt | 0.6 |
| vanilla flavor | 0.1 |
| caramel color | trace |

The water and milk and sodium citrate are placed in a vessel and allowed to dissolve at room temperature. Next the Maltrin and the coffee are dissolved in the vessel. The gum solution is then added and dispersed with strong agitation; stirring is continued for at least 10 minutes to complete gum solution and reaction time. The liquid sweetener is added. The pH of the mixture is adjusted to about 4.2. The acid should be added at 5–10 wt. % dilution with strong agitation. A preservative, if used, can also be added now and should be dissolved prior to addition. The volume of the mixture is adjusted as necessary. The mixture can now be heated to temperature of between about 79 and 83° C. and filled according to conventional procedures.

Whereas particular embodiments of this invention have been described above for purposes of illustration, it will be appreciated by those skilled in the art that numerous variations of the details of the present invention may be made without departing from the invention as defined in the appended claims.

What is claimed is:

1. A process for making a milk product containing, freezable confection having stable opacity, being liquid at room temperature and having a sherbet-like consistency when frozen comprising:

a) mixing a milk product and water in a vessel, wherein said milk product comprises between about 1 and 50 wt. % of the final composition;

b) adding sodium citrate to the mixture of step a) in an amount in excess of about 0.1 wt. % of the total composition;

c) adding sweeteners comprising a combination of natural sweeteners of high sweetness and natural sweeteners of low sweetness to the mixture of step a);

d) stirring the mixture of step c) and heating to about 75 to 82° C.;

e) adding between about 0.2 and 1.0 wt. % a stabilizer solution comprising a mixture of high methoxyl pectin and low methoxyl pectin to the mixture of step d), while maintaining the temperature and using agitation;

f) adjusting the volume of the mixture of step e) with water, if necessary to impart to the confection a density in the approximate range of from 30° to 50° Brix; and g) adjusting the pH of the mixture of step f) to between about 3.0 and 4.5 with an edible acid using agitation; whereby said milk product containing confection will be liquid at room temperature and can be frozen without air whipping to provide a sherbet-like consistency.

2. The process of claim 1, wherein the sweetener is a combination of maltodextrin 25 D.E. and High Fructose Corn Syrup 42 at a ratio of about 70:30.

3. The process of claim 1, wherein the stabilizer comprises high methoxyl pectin and low methoxyl pectin in a ratio of about 50:50.

4. The process of claim 1, wherein said milk product containing freezable confection is milk-based and said milk product is added in a concentration of greater than 30 wt. %.

5. The process of claim 1, wherein the edible acid is either citric or malic acid and one or more acid ingredients are added.

6. The process of claim 1, wherein the edible acid is hydrochloric acid and chocolate flavor is added.

7. The process of claim 1, wherein the edible acid is phosphoric acid and vanilla flavor is added.

8. The confection prepared according to the process of claim 1.

9. The process of claim 1, including:

adding one or more non-acid ingredients selected from the group consisting of natural flavoring, artificial flavoring, natural coloring, artificial coloring, cocoa and chocolate liquor to the mixture of step c).

10. The process of claim 1, including:

adding one or more acid ingredients selected from the group consisting of fruit pulp, fruit puree and fruit concentrate to the mixture of step f).

* * * * *

UNITED STATES PATENT AND TRADEMARK OFFICE
CERTIFICATE OF CORRECTION

PATENT NO. : 6,423,359 B1
DATED : July 23, 2002
INVENTOR(S) : Amiel Braverman

It is certified that error appears in the above-identified patent and that said Letters Patent is hereby corrected as shown below:

<u>Column 4,</u>
Line 1, "on-fat" should read -- non-fat --.

<u>Column 6,</u>
Line 3, "pseudopiastic" should read -- pseudoplastic --.

Signed and Sealed this

Third Day of December, 2002

JAMES E. ROGAN
*Director of the United States Patent and Trademark Office*